(No Model.)

E. S. MATTHEWS.
HYDRAULIC VALVE GEAR.

No. 446,836. Patented Feb. 17, 1891.

Witnesses:
P. P. Sheehan
C. Crawford,

Edwin S. Matthews
Inventor
by James W. See
Attorney

UNITED STATES PATENT OFFICE.

EDWIN S. MATTHEWS, OF CINCINNATI, OHIO.

HYDRAULIC VALVE-GEAR.

SPECIFICATION forming part of Letters Patent No. 446,836, dated February 17, 1891.

Application filed September 15, 1890. Serial No. 364,964. (No model.)

*To all whom it may concern:*

Be it known that I, EDWIN S. MATTHEWS, of Cincinnati, Hamilton county, Ohio, have invented certain new and useful Improvements in Hydraulic Valve-Gears, of which the following is a specification.

It is quite common in certain classes of hydraulic motors—such, for instance, as are employed for ship-steering and for elevators—to employ a small hydraulic motor to move the valve of the main motor, the small motor having a controlling-valve operated by hand. This controlling-valve is often termed a "pilot-valve." If the pilot-valve be open, pressure goes to the small motor, which then proceeds to open the main valve. The small motor will continue its valve-opening function so long as the pilot-valve remains open and until the main valve is completely open. The attendant, desiring a partial opening of the main valve, may close the pilot-valve when the desired movement of the main valve has taken place; but it is desirable that the necessity of this second action by the attendant may be avoided and that the degree of opening of the main valve may be controlled entirely by the degree of opening which he gives to the pilot-valve. This result is accomplished through mechanism by means of which, after the pilot-valve has been given a certain opening, the main valve will, when it reaches the appropriate degree of opening, automatically close the pilot-valve, and thus maintain itself in the desired position of opening.

My invention relates to improvements in such automatic valve-gear, and I illustrate my improvements in connection with an exemplifying small motor and main valve of ordinary type. In the present illustration and description we are concerned only with a main valve and the mechanism for operating it, and no mention is therefore made of the main motor to which this main valve supplies liquid. Therefore, when the term "motor" is employed in this specification, reference is had to the small motor which moves the main valve. Should reference be made to the main motor, it will be spoken of as the "main motor."

My improvements will be readily understood from the following description, taken in connection with the accompanying drawings, in which—

Figure 1:
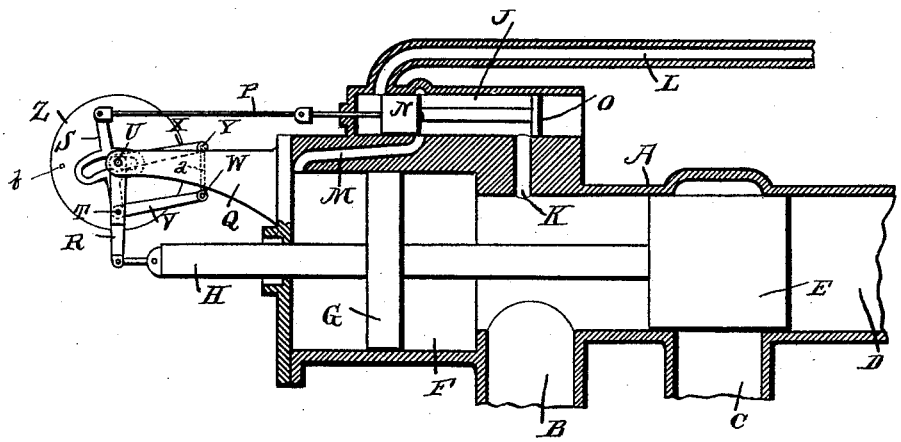
Figure 2:
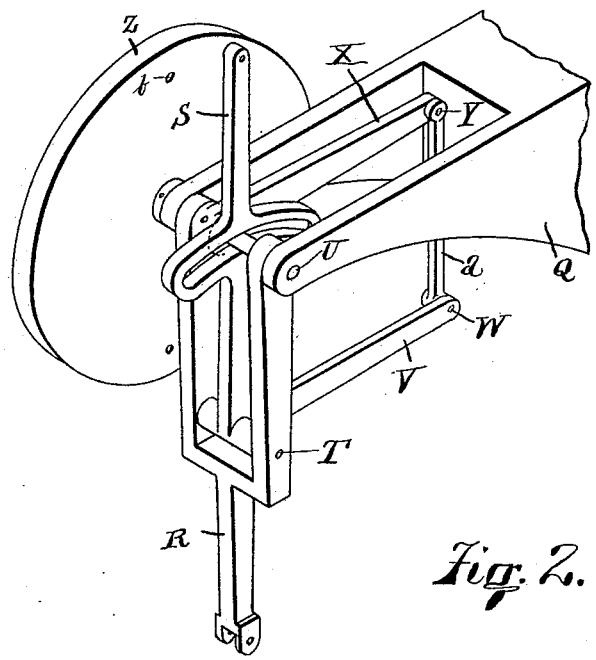

Figure 1 is a vertical diametrical section of an ordinary main valve and its operating-motor provided with automatic gear exemplifying my invention, the automatic gear appearing in side elevation; and Fig. 2, a perspective view of the automatic gear.

In the accompanying drawings, A indicates an ordinary valve-casing; B, the inlet thereto from the main; C, the pipe to the main motor; D, the exhaust-pipe; E, the main valve, shown in its mid-position as closing pipe C, the function of this valve being to place the main motor-pipe C in connection with the main B when the valve is moved to the right and in connection with the exhaust D when the valve is moved to the left; F, the cylinder of the motor, it being understood that by the motor is meant the hydraulic machine for moving the valve E; G, the motor-piston, connected with valve E and working in the cylinder F; H, the motor-piston rod, projecting out from the motor-cylinder; J, the valve-seat of the pilot-valve, the pilot-valve being the valve that controls the motion of the motor-piston G; K, the inlet-pipe placing the pilot-valve seat always in communication with the main; L, exhaust-pipe from the pilot-valve seat; M, port from pilot-valve seat to the motor-cylinder; N, the pilot-valve working in the pilot-valve seat, and adapted, when moved to the left, to admit the water under pressure from the main to the motor cylinder, or when moved to the right to permit the water to exhaust from the motor-cylinder, the valve being shown as in partial open position; O, counterbalancing-piston attached to the pilot-valve, and P the stem of the pilot-valve.

There is nothing peculiar about the parts or mode of operation of the parts thus far referred to. The valve E is in closed position. The pilot-valve is partially open and water flows to the left of the motor-piston G, and that piston and the main valve E will move to the right, and water from main B will then be at liberty to flow to main motor-pipe C. The opening motion of the main valve would of course continue until its stroke was completed; but if when the main valve is but partially open the pilot-valve be closed the main valve will come to rest in its partially-open position. If the pilot-valve be moved to the right, the liquid may escape from the motor-cylinder through port M and exhaust L, and the main valve E will move to the right, the effect of which is, first, to close pipe C, and, second, to place that pipe in connection with main exhaust B. Thus the main valve is opened or closed by the setting of the pilot-valve, and the degree of the opening or closure of the main valve is controlled by the time during which the pilot-valve permits water to flow in appropriate direction through port M. It is the duty of the automatic valve-gear to close the pilot-valve when the main valve has reached a degree of opening appropriate to the degree of opening given to the pilot-valve.

Q indicates a bracket to support a pivot; R, a lever, to be termed the "primary lever," having one of its ends freely pivoted on such pivot and having its other end linked to the piston-rod H of the motor, so that as the piston-rod makes its stroke the lever oscillates; S, a lever, to be termed the "secondary lever," pivoted at one end to an intermediate portion of the lever R and having its other end connected with the stem P of the pilot-valve, so that if the lever S be rocked upon its pivot the pilot-valve will be moved in its seat; T, a pivot carried by the primary lever and moving in an arc as the primary lever oscillates, this pivot being the one on which the secondary lever is pivoted; U, the bracket-pivot on which the primary lever R oscillates, this pivot being shown in the exemplification as a shaft loose in the bracket and in the lever R; V, a lever rigid with lever S and forming with that lever a bell-crank lever; W, a pivot at the extremity of lever V; X, a lever fast on the pivot-shaft U and disposed parallel with lever V; Y, a pivot at the extremity of lever X; Z, a disk fast upon pivot-shaft U and serving merely to exemplify a means by which that pivot-shaft may be rotated; $a$, a link connecting pivots W and Y, the length of this link being equal to the distance between pivots U and T; and $b$, attachment-holes in disk Z. By means of the disk the pivot-shaft U may be partially rotated and then held in position.

Ropes or other connections may lead from disk Z to any desired point of control, or rods may connect at attaching-holes $b$. The function of the disk is of course that of a mere lever to serve in giving partial rotation to the pivot-shaft. The effect of the partial rotation of the pivot-shaft is to raise or lower the lever X, and consequently to oscillate the secondary lever S upon its pivot T. When the pilot-valve is in mid-position, it is in closed position and the main valve E is held in whatever position it may happen then to occupy. The main valve is shown as in closed position, and the disk has been so turned as to partially open the pilot-valve, and the disk, being held, maintains the fixed position for the pivot Y. Under these conditions water flows through port M and the pressure on the motor-piston moves the main valve E to the right. During this movement of the main valve the lower end of primary lever R will be moved to the right and the secondary lever S will be moved bodily to the right, the link $a$ swinging on stationary pivot Y. The effect of this bodily movement of the secondary lever will be to move the pilot-valve to the right and finally close port M. When this port is closed, the main valve will cease its movement and remain fixed. The time at which the main valve will cease its opening movement will depend on the degree of deflection which has been given to the lever S by adjustment of disk, the parts all coming to rest whenever the movement of the lever S to the right brings that lever and the pilot-valve to its central or neutral position of closure.

Assume that lever S, instead of being adjusted to the left, as shown, be by means of the disk adjusted to the right far enough to place port M in communication with exhaust L. The main valve will then move to the left and the main-motor pipe C will be placed in communication with main exhaust D. During this movement of the main valve the secondary lever will have been moved bodily to the left, and when the pilot-valve has reached its closed position the main valve will come to rest. Thus it will be seen that movement of the main valve will effect a closure of the pilot-valve, resulting in bringing the main valve to rest, and that the degree of movement of the main valve will be controlled by the degree of adjusting movement given to the secondary lever.

My invention involves what may called a "duplex lever," consisting of a primary lever and a secondary lever, the latter being mounted upon a pivot carried upon and moved by the primary lever, and the invention is thus distinguished from other systems.

Of course it is understood that if, after the secondary lever is actuated to open the pilot-valve or to move the same to start the valve-motor, the secondary lever is not held by its actuating or adjusting means the valve-motor will open the valve to its fullest extent. This by itself forms a complete operative mechanism, as in some instances it is not desired to limit the movement of the main valve, but simply to open the same. Finally, while my invention has here been shown in what is considered a preferred form, it is understood that the invention is not limited to the particular construction herein specified. The main valve, main-valve motor, and pilot-valve may be of any approved type and arrangement. The primary and secondary levers may be of any desired form or class, and according as different forms are used they may effect the proper movement by oscillation, translation, or combined oscillation and translation, and the scope of my invention is not limited to the exact form and manner of operation shown. The only requisite in construction is that the movement of the secondary lever must be such in relation to the pilot-valve and main-valve motor that the said secondary lever will move the pilot-valve in a direction to properly control the motor.

I claim as my invention—

1. The combination of the main valve, its actuating-motor, the pilot-valve adapted to control this motor, a primary lever suitably fulcrumed and connected to a moving part of the motor, and a secondary lever fulcrumed on the primary lever and connected to the pilot-valve, substantially as described.

2. The combination of the main valve, its actuating-motor, the pilot-valve adapted to control this motor, a primary lever suitably fulcrumed and connected to a moving part of the motor, a secondary lever fulcrumed on the primary lever and connected to the pilot-valve, and means for adjusting the secondary lever to correspond with the required movement of the pilot-valve to control the motor, substantially as described.

EDWIN S. MATTHEWS.

Witnesses:
J. W. SEE,
ISRAEL WILLIAMS.